United States Patent Office 3,225,037
Patented Dec. 21, 1965

3,225,037
10-[(AMINO- AND ACYLAMINO-1-PIPERIDYL) LOWER-ALKYL]-PHENOTHIAZINES
Bernard L. Zenitz, Colonie, and Lewis P. Albro, North Greenbush, N.Y., assignors to Sterling Drug Inc., New York, N.Y., a corporation of Delaware
No Drawing. Filed Mar. 30, 1959, Ser. No. 802,624
17 Claims. (Cl. 260—243)

This invention relates to compositions of matter known as phenothiazinylalkylamines.

The 10-[(1-piperidyl)lower-alkyl]phenothiazines unsubstituted or substituted in the phenothiazine moiety by substituents of the nature commonly known in phenothiazine derivatives, such as those of the chlorpromazine type, are known.

The invention here resides in the concept of such types of phenothiazines wherein the piperidine ring is substituted specifically in one of the 3- and 4-positions by an amino or a lower-acylamino radical, together with a process for physically embodying such concept and the utility inherent in such embodiments.

Among the compounds within the scope of our invention are those illustrated by the following structural formula:

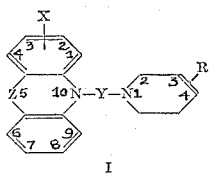

I wherein X represents hydrogen, halogen, trifluoromethyl, cyano, a lower-alkanoyl, lower-alkylmercapto, lower-alkylsulfonyl, lower-alkylsulfinyl, lower-alkoxy, or a lower-alkyl radical; Y represents a lower-alkylene radical, Z represents a sulfur atom, the sulfoxide group, or the sulfone group; and R represents either a lower-acylamino or an amino radical in one of the 3- or 4-positions of the piperidine ring.

In the above Formula I, the substituent represented by X can occupy any of the four available positions in the benzene ring, although the 2- and 4-positions are preferred. When X represents halogen, it can be any of the four halogens, fluorine, chlorine, bromine or iodine. When X represents a lower-alkanoyl, lower-alkylmercapto, lower-alkylsulfonyl, lower-alkylsulfinyl, lower-alkoxy or lower-alkyl radical, it can contain from one to about five carbon atoms and can be either straight or branched. The substituent represented by X thus includes such groups, inter alia, as acetyl, propionyl, methylmercapto, isobutylmercapto, methylsulfonyl, isobutylsulfonyl, methylsulfinyl, isobutylsulfinyl, methoxy, amyloxy, isopropyl and n-butyl. Such illustrative and other like simple substituents on the benzene ring of the phenothiazine moiety of the substituted-piperidyl compositions forming the subject matter of the present invention do not vitiate the beneficial pharmacological properties inherent in said compositions and are the full equivalents of the hereinafter claimed invention.

In the above general Formula I, the alkylene bridge Y has from two to about five carbon atoms, may be straight or branched and is such that the nitrogen atoms of the phenothiazine and piperidine moieties are separated by at least two carbon atoms. Thus Y includes such groups as ethylene, $CH_2CH_2$; propylene, $$CH_2CH_2CH_2$$

1-methylethylene, $CH(CH_3)CH_2$; 2-methylethylene, $$CH_2CH(CH_3)$$

butylene, $CH_2CH_2CH_2CH_2$; 1-methylpropylene, $$CH(CH_3)CH_2CH_2$$

pentylene, $CH_2CH_2CH_2CH_2CH_2$; and the like. A particularly preferred group of compounds are those in which Y is propylene, $CH_2CH_2CH_2$.

In the above Formula I, R represents either a lower-acylamino or an amino radical in one of the 3- or 4-positions of the piperidine ring. When R represents a lower-acylamino radical, the lower-acyl moiety can contain from one to about ten carbon atoms and can be either a straight or branched lower-alkanoyl or a monocarbocyclic aroyl radical further substituted by one or more radicals such as halogen (for example, chlorine and bromine), lower-alkyl, lower-alkoxy, lower-alkylmercapto, lower-alkanoyl, lower-alkylsulfonyl, and lower-alkylsulfinyl. Thus R represents such groups, inter alia, as formylamino, acetylamino, propionylamino, isobutyroylamino, benzoylamino, p - chlorobenzoylamino, p-bromobenzoylamino, p-toluylamino, p-methoxybenzoylamino, p-acetylbenzoylamino, p-methylsulfonylbenzoylamino and p-methylsulfinylbenzoylamino.

The compounds of the invention wherein R is a lower-acylamino radical are prepared by reacting a phenothiazine with a 3- or 4-lower-acylaminopiperidine in which either the phenothiazine or the piperidine moiety bears attached to the ring nitrogen atom a halo-lower-alkyl radical. A preferred method comprises heating a 3- or 4-lower-acylaminopiperidine with a 10-(halo-lower-alkyl)phenothiazine at a temperature between about 50° C. and 150° C. in the presence of an acid-acceptor. The reaction is preferably carried out in an organic solvent, inert under the conditions of the reaction, such as anhydrous ethanol, benzene, xylene, and the like. The purpose of the acid-acceptor is to take up the hydrogen halide which is split out during the course of the reaction. The acid-acceptor is a basic substance which forms water-soluble by-products easily separable from the main product of the reaction, and includes such substances as alkali metal salts of weak acids, e.g., sodium carbonate, potassium lower-acylhalides at a temperature between about —10° C. and about 90° C. The reaction can be effected with or without the use of an acid-acceptor if desired. The purpose of the acid-acceptor is to take up the hydrogen halide produced when a lower-acyl halide is the acylating agent or the lower-alkanoic acid produced when a lower-acyl anhydride is the acylating agent. Suitable acid-acceptors are pyridine, sodium carbonate, sodium acetate, triethylamine, sodium hydroxide and the like.

The compounds of Formula I wherein Z is SO or $SO_2$ can be prepared by reacting a 10-(halo-lower-alkyl)-phenothiazine-5-oxide or 10-(halo-lower-alkyl)phenothiazine-5,5-dioxide, respectively, with a 3- or 4-lower-acylaminopiperidine and, if desired, hydrolyzing the lower-acylaminopiperidyl compound produced to the corresponding 3- or 4-aminopiperidyl compound described above. The intermediate 10-(halo-lower-alkyl)phenothiazine-5-oxides and 10-(halo-lower-alkyl)phenothiazine-5,5-dioxides can be prepared by oxidizing the parent 10-(halo-lower-alkyl)phenothiazines with one or with two molar equivalents of hydrogen peroxide, respectively, in an appropriate organic solvent. In preparing the 5-oxide, it is preferred that the reaction be carried out at low temperatures in the range from about 0° C. to about 25° C. in ethanol whereas preparation of the 5,5-dioxide is preferably conducted at more elevated temperatures in the range from about 50° C. to about 115° C. in glacial acetic acid.

Alternatively, the compounds of Formula I wherein Z represents SO or $SO_2$ may be prepared directly from the compounds of Formula I wherein Z represents S by oxidation with hydrogen peroxide as before. In this latter procedure, a further oxidation of the piperidyl nitrogen atom to the N-oxide may occur, and in such case it is necessary to reduce the N-oxide group back to the carbonate, sodium acetate, sodium alkoxides, sodium amide, and the like. The acid-acceptor can also be in the form of an excess quantity of the 3- or 4-lower-acylaminopiperidine.

The reaction of a 10-(halo-lower-alkyl)phenothiazine with a lower-acylaminopiperidine takes place under relatively mild conditions, a preferred, specific method comprising heating the reactants in boiling ethanol solution in the presence of anhydrous sodium carbonate.

The reaction of a phenothiazine with an N-(halo-lower-alkyl)-lower-acylaminopiperidine requires somewhat vigorous conditions, a preferred method comprising heating the reactants in boiling xylene in the presence of sodium amide.

The compounds of Formula I wherein R is an amino radical are prepared from the corresponding 10-[(3- or 4-lower-acylamino-1-piperidyl)-lower - alkyl]phenothiazines by reacting the latter under hydrolytic conditions with aqueous mineral acids, for example hydrochloric acid, phosphoric acid, sulfuric acid and the like, or with aqueous alkalies, for example sodium hydroxide and potassium hydroxide. A preferred method comprises heating the 10-[(3- or 4-lower-acylamino-1-piperidyl)-lower-alkyl]phenothiazines in aqueous mineral acid at a temperature in the range from about 80° C. to about 150° C. A preferred mineral acid is hydrochloric acid.

The compounds of Formula I wherein R is lower-acylamino can also be prepared from the compounds wherein R is amino by reacting the latter with an acylating agent which on reaction provides a lower-acyl radical containing from one to about ten carbon atoms. A preferred method comprises reacting the 10-[(3- or 4-amino-1-piperidyl)lower-alkyl]phenothiazines with a member of the group consisting of lower-acyl anhydrides and tertiary amine with an appropriate reducing agent as, for example, sodium bisulfite.

The intermediate 10-(halo-lower-alkyl)phenothiazines are a known class of compounds. They can be prepared by reacting the 10-lithio derivative of phenothiazine or of a substituted phenothiazine with the appropriate halo-lower-alkyl p-toluenesulfonate. The substituted phenothiazines are in turn prepared by known methods.

The water-soluble acid-addition salts and the quaternary ammonium salts of the bases herein described are the form in which the bases are most conveniently prepared for use and are the full equivalents of the subject matter herein specifically claimed. The preferred type of salts are pharmacologically acceptable salts, that is, salts whose anions are innocuous to the animal organism in pharmacodynamic doses of the salts, so that beneficial physiological properties inherent in the free bases are not vitiated by side-effects ascribable to the anions; in other words, the latter do not substantially affect the pharmacological properties inherent in the cations. Appropriate acid addition salts are those derived from mineral acids such as hydrochloric acid, hydrobromic acid, hydriodic acid, nitric acid, sulfuric acid and phosphoric acid; and organic acids such as acetic acid, citric acid, lactic acid, and tartaric acid. The quaternary ammonium salts are obtained by the addition of esters having a molecular weight less than about 200 to the free base form of the compounds. A preferred class of esters comprises lower-alkyl, lower-alkenyl or monocarbocyclic aryl-lower-alkyl esters of inorganic acids or organic sulfonic acids, and includes such compounds as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts are prepared by mixing the free base and the alkyl, alkenyl or aralkyl esters in an organic solvent inert under the conditions of reaction, for example, ethanol, methanol, ether, acetonitrile and the like. Heating can be used to facilitate the reaction, although salt formation usually takes place readily at room temperature. The quaternary ammonium salt separates directly or can be obtained by concentration of the solution.

Although therapeutically acceptable salts are preferred, those having toxic anions are also useful. All acid-addition salts are useful as intermediates in purification of the free bases, and toxic acid-addition and quaternary ammonium salts are useful as intermediates in preparing therapeutically acceptable salts by ion exchange procedures.

Pharmacological evaluation of the compounds of the invention, including their equivalents as herein set forth, in mice and dogs has demonstrated that they possess a variety of depressant actions on the central and autonomic nervous system, the cardiovascular system and the skeletal-muscular system. They lower the blood pressure and antagonize the pressor effects of epinephrine in dogs, they decrease the incidence of vomiting induced by apomorphine in dogs, they lower the rectal temperature in mice, they potentiate the sleeping time in mice induced by ether, thiopental sodium, or hexobarbital sodium, and they inhibit local dextran edema and the formation of granuloma pouches in rats. These results indicate their usefulness as hypotensive agents, antinauseants, antipyretics, sedatives and anti-inflammatory agents. The compounds can be prepared for use by dissolving under sterile conditions a salt form of the compounds in water (or an equivalent amount of a non-toxic acid if the free base is used), or in a physiologically compatible aqueous medium such as saline, and stored in ampules for intramuscular injection. Alternatively, they can be incorporated in tablet or capsule form for oral administration. They are formulated and used in the same way as known compounds having similar activities, such as chlorpromazine. The toxicity of the compounds of the invention is of the same order of magnitude as that of chlorpromazine.

The structures of the compounds of the invention have been established by the mode of synthesis and corroborated by chemical analysis.

The following examples will further illustrate the invention without the latter being limited thereto.

PREPARATION OF INTERMEDIATES

*Example 1*

*3-acetylaminopiperidine.*—Twenty-five grams (0.184 mole) of acetylaminopyridine were dissolved in 96 ml.

of 2N-HCl and 104 ml. of water. One gram of platinum oxide was added and the mixture was reduced under 60 pounds p.s.i. of hydrogen at 55–60° C. Reduction was completed in six hours. The cooled reaction mixture was filtered, and the filtrate was concentrated to a volume of about 60 ml. and basified with solid potassium carbonate. The aqueous mixture was extracted once with chloroform, then with a chloroform-benzene mixture. The combined extracts were dried over calcium sulfate and taken to dryness leaving 22.7 g. of crude product which was recrystallized twice from ethyl acetate giving 16.45 g. of 3-acetylaminopiperidine, M.P. 75–80° C. (uncorr.).

*Analysis.*—Calcd. for $C_7H_{14}N_2O$: N (basic), 9.85. Found: N (basic), 10.06.

Example 2

*4-acetylaminopiperidine.*—4-acetylaminopyridine (27.2 g., 0.2 mole) was dissolved in 13.2 g. of glacial acetic acid and 200 ml. of water. One gram of platinum oxide was added and the mixture was reduced under 600 pounds p.s.i. of hydrogen at 92–95° C. The cooled reaction mixture was filtered and the solvent removed in vacuo. The solid residue was sublimed twice at 100–120° C. and 0.02 mm. Hg giving 18.0 g. of 4-acetylaminopiperidine, M.P. 139–140.5° C. (uncoor.).

*Analysis*—Calcd. for $C_7H_{14}N_2O$: C, 59.12; H, 9.92. Found: C, 59.19; H, 9.94.

PREPARATION OF FINAL PRODUCTS

Example 3

*10-[3-(3-acetylatmino-1-piperidyl)propyl]phenothiazine* (I; X is H, Y is $(CH_2)_3$, Z is S, R is 3-$CH_3CONH$).—A mixture of 11.0 g. (0.04 mole) of 10-(3-chloropropyl)-phenothiazine, 5.7 g. (0.04 mole) of 3-acetylaminopiperidine, and 8.50 g. of sodium carbonate in 150 ml. of absolute ethanol was refluxed for seventy-two hours. The reaction mixture was filtered and the filtrate taken to dryness leaving 16.6 g. of crude product which was taken into benzene, washed once with water, then with dilute HCl and finally with water. The combined aqueous acid extracts were basified with ammonium hydroxide and extracted with chloroform. The organic extracts were dried over calcium sulfate and taken to dryness leaving 12.6 g. of an oil which solidified on trituration with ethyl acetate. The crude product was recrystallized twice from ethyl acetate giving 9.48 g. of 10-[3-(3-acetylamino-1-piperidyl)propyl]phenothiazine, M.P. 118.8–122.4° C. (corr.).

*Analysis.*—Calcd. for $C_{22}H_{27}N_3OS$: N (total), 11.02; N (basic), 3.67. Found: N (total), 11.01; N (basic), 3.84.

10-[3-(3-acetylamino - 1 - piperidyl)propyl]phenothiazine, when administered subcutaneously to mice produced potentiation of hexobarbital sleeping time; when administered intravenously in rats it showed adrenolytic activity as evidenced by antagonism of the pressor effects of epinephrine; and it inhibited local dextran edema in rats when administered orally every day for three days. The effective dose, $ED_{50}$, of 10-[3-(3-acetylamino-1-piperidyl)propyl]phenothiazine in inducing sleep in mice to which 40 mg./kg. of hexobarbital was administered, was $25\pm11$ mg./kg. The $ED_{50}$ in antagonizing epinephrine was $17\pm4.6$ mcg./kg. At doses of 50 and 100 mg./kg./day, it produced 45% and 65% inhibition of dextran edema, respectively. Toxicity studies with 10-[3-(3-acetylamino-1-piperidyl)propyl]phenothiazine given intravenously in mice have shown the $LD_{50}$ to be $33.5\pm2.8$ mg./kg., where $LD_{50}$ is defined as the dose fatal to 50% of the animals at that particular dose level.

10-[3-3 - acetylamino-1-piperidyl)propyl]phenothiazine can be reacted with hydrobromic acid, hydriodic acid, sulfuric acid, phosphoric acid, acetic acid, citric acid, tartaric acid, quinic acid, methyl iodide, methyl bromide, ethyl bromide, allyl bromide, benzyl chloride, 2-chlorobenzyl chloride, or methyl p-toluenesulfonate to give the hydrobromide, hydriodide, sulfate (or bisulfate), phosphate (or acid phosphate), acetate, citrate (or acid citrate, tartrate (or bitartrate), quinate, methiodide, methobromide, ethobromide, allobromide, benzochloride, 2-chlorobenzochloride, or metho-p-toluenesulfonate salts, respectively.

10-[3-(3-acetylamino - 1 - piperidyl)propyl]phenothiazine in the form of its hydrofluoride salt can be converted to the hydrochloride salt by passing an aqueous solution of the former over an ion-exchange resin saturated with chloride ions, for example, Rohm and Haas' Amberlite® IRA–400 resin.

Example 4

*10-[3-(3 - acetylamino-1-piperidyl)propyl] - 2 - chlorophenothiazine* (I; X is 2-Cl, Y is $(CH_2)_3$, Z is S, R is 3-$CH_3CONH$) was prepared from 12.4 g. (0.04 mole) of 10-(3-chloropropyl)-2-chlorophenothiazine, 5.7 g. (0.04 mole) of 3-acetylaminopiperidine and 8.4 g. (0.08 mole) of anhydrous sodium carbonate in 200 ml. of absolute ethanol according to the manipulative procedure described above in Example 3. The crude product was recrystalized twice from ethyl acetate giving 9.8 g. of 10-[3-(3-acetylamino-1-piperidyl)propyl] - 2 - chlorophenothiazine, M.P. 141.6–143.6° C. (corr.).

*Analysis.*—Calcd. for $C_{22}H_{26}ClN_3OS$: N, 10.10; S, 7.70. Found: N, 10.04; S, 7.87.

The effective dose, $ED_{50}$, of 10-[3-(3-acetylamino-1-piperidyl)propyl]-2-chlorophenothiazine in inducing sleep in mice to which 40 mg./kg. of hexobarbital was administered, was $4.85\pm1.47$ mg./kg. Given orally in rats at doses of 50 and 100 mg./kg./day for three days, it produced 55% and 40% inhibition of dextran edema, respectively, and at 50 and 100 mg./kg./day for ten days, it produced 50% and 40% inhibition of granuloma pouch formation, respectively. The $LD_{50}$ determined intravenously in mice was shown to be $50\pm3.5$ mg./kg.

Example 5

*10-[3-(3-amino - 1 - piperidyl)propyl]-2-chlorophenothiazine dihydrochloride* (I; X is 2-Cl, Y is $(CH_2)_3$, Z is S, R is 3-$NH_2$).—Five grams (0.012 mole) of 10-[3-(3-acetylamino-1-piperidyl)propyl] - 2 - chlorophenothiazine were dissolved in 50 ml. of concentrated hydrochloric acid and 100 ml. of water. The solution was refluxed for eight hours and taken to dryness in vacuo. The solid residue was recrystallized once from an ethanolether mixture and once from absolute ethanol giving 3.8 g. of 10 - [3-(3-amino-1-piperidyl)propyl]-2-chlorophenothiazine dihydrochloride (melts indefinitely beginning at 162.4° C.).

*Analysis.*—Calcd. for $C_{20}H_{24}ClN_3S \cdot 2HCl$: N, 9.40; Cl, 15.87. Found: N, 9.37; Cl, 15.67.

The effective dose, $ED_{50}$, of 10-[3-(3-amino-1-piperidyl)-propyl]-2-chlorophenothiazine dihydrochloride in inducing sleep in mice to which 40 mg./kg. of hexobarbital was administered, was $66.5\pm19.8$ mg./kg. The $ED_{50}$ in antagonizing the effects of epinephrine in rats was $680\pm17.7$ mcg./kg. The $LD_{50}$ determined intravenously in rats was shown to be $53\pm3.0$ mg./kg.

Example 6

*10-[3 - (4-acetylamino - 1-piperidyl)propyl] - 2-chlorophenothiazine* (I; X is 2-Cl, Y is $(CH_2)_3$, Z is S, R is 4-$CH_3CONH$) was prepared from 18.6 g. (0.06 mole) of 10-(3-chloropropyl)-2-chlorophenothiazine, 8.9 g. (0.063 mole) of 4-acetylaminopiperidine and 12.6 g. (0.12 mole) of anhydrous sodium carbonate in 150 ml. of absolute ethanol according to the manipulative procedure described above in Example 3. The crude product was recrystallized from an acetone-hexane mixture giving 4.3 g. of 10-[3-(4-acetylamino-1-piperidyl)propyl]-2-chlorophenothiazine, M.P. 117.0–119.4° C. (corr.).

*Analysis.*—Calcd. for $C_{22}H_{26}ClN_3OS$: N, 10.10; S, 7.71. Found: N, 10.03; S, 7.71.

The $ED_{50}$ of 10-[3-(4-acetylamino-1-piperidyl)propyl]-

2-chlorophenothiazine in inducing sleep in mice to which 40 mg./kg. of hexobarbital was administered was found to be 1.88±0.27 mg./kg. Given orally in rats at doses of 25 and 50 mg./kg./day for three days, it produced 85% and 70% inhibition of dextran edema, respectively, and at 20 and 25 mg./kg./day for ten days, it produced 35% and 60% inhibition of granuloma pouch formation, respectively.

*Example 7*

10 - [3 - (4 - acetylamino - 1 - piperidyl)propyl] - 2 - chlorophenothiazine-5-oxide (I; X is 2-Cl, Y is $(CH_2)_3$, X is SO, R is 4-$CH_3CONH$).—By following the manipulative procedure described above in Example 6 and by replacing the 10-(3-chloropropyl)-2-chlorophenothiazine used therein with a molar equivalent amount of 10-(3-chloropropyl) - 2 - chlorophenothiazine-5-oxide (prepared by oxidation of 10-(3-chloropropyl)-2-chlorophenothiazine with one molar equivalent of hydrogen peroxide in ethanol), there can be obtained 10 - [3 - (4-acetylamino-1-piperidyl)propyl]-2 - chlorophenothiazine - 5 - oxide.

*Example 8*

10 - [3 - (4 - acetylamino - 1 - piperidyl)propyl] - 2 - chlorophenothiazine - 5,5 - dioxide (I; X is 2 - Cl, Y is $(CH_2)_3$, Z is $SO_2$, R is 4-$CH_3CONH$).—By following the manipulative procedure described above in Example 6 and by replacing the 10-(3-chloropropyl) - 2 - chlorophenothiazine used therein with a molar equivalent amount of 10 - (3 - chloropropyl) - 2 - chlorophenothiazine - 5,5 - dioxide (prepared by oxidation of 10 - (3-chloropropyl)-2-chlorophenothiazine with hydrogen peroxide in glacial acetic acid), there can be obtained 10-[3-(4-acetylamino-1 - piperidyl)propyl] - 2 - chlorophenothiazine-5,5-dioxide.

*Example 9*

10 - [3 - (4 - acetylamino - 1 - piperidyl)propyl] - 4 - chlorophenothiazine (I; X is 4-Cl, Y is $(CH_2)_3$, Z is S, R is 4-$CH_3CONH$).—By following the manipulative procedure described above in Example 6 and by replacing the 10 - (3 - chloropropyl) - 2 - chlorophenothiazine used therein with a molar equivalent amount of 10-(3-chloropropyl)-4-chlorophenothiazine, there can be obtained 10-[3-(4-aceylamino-1-piperidyl)propyl] - 4 - chlorophenothiazine.

*Example 10*

10 - [3 - (4 - acetylamino - 1 - piperidyl)propyl] - 4 - fluorophenothiazine (I; X is 4-F, Y is $(CH_2)_3$, Z is S, R is 4-$CH_3CONH$).—By following the manipulative procedure described above in Example 6 and by replacing the 10-(3-chloropropyl)-2 - chlorophenothiazine used therein with a molar equivalent amount of 10-(3-chloropropyl)-4-fluorophenothiazine, there can be obtained 10-[3-(4-acetylamino-1-piperidyl)propyl] - 4 - fluorophenothiazine.

*Example 11*

10 - [3 - (4 - acetylamino - 1 - piperidyl)propyl] - 4 - bromophenothiazine (I; X is 4-Br, Y is $(CH_2)_3$, Z is S, R is 4-$CH_3CONH$).—By following the manipulative procedure described above in Example 6 and by replacing the 10 - (3 - chloropropyl) - 2 - chlorophenothiazine used therein with a molar equivalent amount of 10-(3-chloropropyl)-4-bromophenothiazine, there can be obtained 10-[3-(4-acetylamino - 1 - piperidyl)propyl]-4-bromophenothiazine.

*Example 12*

10 - [3 - (4 - acetylamino - 1 - piperidyl)propyl] - 4 - iodophenothiazine (I; X is 4-I, Y is $(CH_2)_3$, Z is S, R is 4-$CH_3CONH$).—By following the manipulative procedure described above in Example 6 and by replacing the 10-(3-chloropropyl)-2 - chlorophenothiazine used therein with a molar equivalent amount of 10-(3-chloropropyl)-4-iodophenothiazine, there can be obtained 10 - [3 - (4-acetylamino-1-piperidyl)propyl]-4-iodophenothiazine.

*Example 13*

10 - [3 - (4 - acetylamino - 1 - piperidyl)propyl] - 2 - trifluoromethylphenothiazine (I; X is 2-$CF_3$, Y is $(CH_2)_3$, Z is S, R is 4-$CH_3CONH$).—By following the manipulative procedure described above in Example 6 and by replacing the 10-(3-chloropropyl)-2-chlorophenothiazine used therein with a molar equivalent amount of 10-(3-chloropropyl)-2 - trifluoromethylphenothiazine, there can be obtained 10-[3-(4-acetylamino - 1 - piperidyl)propyl]-2-trifluoromethylphenothiazine.

*Example 14*

10 - [3 - (4 - acetylamino - 1 - piperidyl)propyl] - 2 - acetylphenothiazine (I; X is 2-$CH_3CO$, Y is $(CH_2)_3$, Z is S, R is 4-$CH_3CONH$).—By following the manipulative procedure described above in Example 6 and by replacing the 10-(3-chloropropyl) - 2 - chlorophenothiazine used therein with a molar equivalent amount of 10-(3-chloropropyl) - 2 - acetylphenothiazine, there can be obtained 10 - [3-(4-acetylamino - 1 - piperidyl)propyl] - 2 - acetylphenothiazine.

*Example 15*

10 - [3 - (4 - acetylamino - 1 - piperidyl)propyl] - 2 - propionylphenothiazine (I; X is 2-$CH_3CH_2CO$, Y is $(CH_2)_3$, Z is S, R is 4-$CH_3CONH$).—By following the manipulative procedure described above in Example 6 and by replacing the 10 - (3 - chloropropyl) - 2 - chlorothiazine used therein with a molar equivalent amount of 10-(3-chloropropyl - 2 - propionylphenothiazine, there can be obtained 10 - [3 - (4 - acetylamino - 1 - piperidyl) propyl]-2-propionylphenothiazine.

*Example 16*

10 - [3 - (4 - acetylamino - 1 - piperidyl)propyl] - 2 - methylmercaptophenothiazine (I; X is 2 - $CH_3S$, Y is $(CH_2)_3$, Z is S, R is 4-$CH_3CONH$).—By following the manipulative procedure described above in Example 6 and by replacing the 10-(3-chloropropyl)-2-chlorophenothiazine used therein with a molar equivalent amount of 10 - (3 - chloropropyl) - 2 - methylmercaptophenothiazine, there can be obtained 10-[3 - (4 - acetylamino-1-piperidyl)propyl]-2 - methylmercaptophenothiazine.

*Example 17*

10 - [3 - (4 -acetylamino-1-piperidyl)propyl]-2-isobutylmercaptophenothiazine (I; X is 2-$(CH_3)_2CHCH_2S$, Y is $(CH_2)_3$, Z is S, R is 4-$CH_3CONH$).—By following the manipulative procedure described above in Example 6 and by replacing the 10-(3-chloropropyl)-2-chlorophenothiazine used therein with a molar equivalent amount of 10 - (3 - chloropropyl)-2-isobutylmercaptophenothiazine, there can be obtained 10-[3-(4-acetylamino-1-piperidyl)-propyl]-2-isobutylmercaptophenothiazine.

*Example 18*

10 - [3-(4-acetylamino-1-piperidyl)propyl]-2-methylsulfonylphenothiazine (I; X is 2-$CH_3SO_2$, Y is $(CH_2)_3$, Z is S, R is 4-$CH_3CONH$).—By following the manipulative procedure described above in Example 6 and by replacing the 10-(3-chloropropyl)-2-chlorophenothiazine used therein with a molar equivalent amount of 10-(3-chloropropyl)-2-methylsulfonylphenothiazine, there can be obtained 10 - [3 - (4 - acetylamino-1-piperidyl)propyl]-2-methylsulfonylphenothiazine.

*Example 19*

10-[3-(4-acetylamino-1-piperidyl)propyl]-2-isobutylsulfonylphenothiazine (I; X is 2-$(CH_3)_2CHCH_2SO_2$, Y is $(CH_2)_3$, Z is S, R is 4-$CH_3CONH$).—By following the manipulative procedure described above in Example 6 and by replacing the 10-(3-chloropropyl)-2-chlorophenothiazine used therein with a molar equivalent amount of 10 - (3 - chloropropyl) - 2 - isobutylsulfonylphenothiazine, there can be obtained 10-[3-(4-acetylamino-1-piperidyl)-propyl]-2-isobutylsulfonylphenothiazine.

Example 20

10 - [3-(4-acetylamino-1-piperidyl)propyl]-2-methylsulfinylphenothiazine (I; X is 2-CH$_3$SO, Y is (CH$_2$)$_3$, Z is S, R is 4-CH$_3$CONH).—By following the manipulative procedure described above in Example 6 and by replacing the 10-(3-chloropropyl)-2-chlorophenothiazine used therein with a molar equivalent amount of 10-(3-chloropropyl)-2-methylsulfinylphenothiazine, there can be obtained 10-[3-(4 - acetylamino -1-piperidyl)propyl]-2-methylsulfinylphenothiazine.

Example 21

10-[3-(4-acetylamino-1-piperidyl)propyl]-2-isobutylsulfinylphenothiazine (I; X is 2-(CH$_3$)$_2$CHCH$_2$SO, Y is (CH$_2$)$_3$, Z is S, R is 4-CH$_3$CONH).—By following the manipulative procedure described above in Example 6 and by replacing the 10-(3-chloropropyl)-2-chlorophenothiazine used therein with a molar equivalent amount of 10 - (3 - chloropropyl) - 2 - isobutylsulfinylphenothiazine, there can be obtained 10-[3-(4-acetylamino-1-piperidyl)propyl]-2-isobutylsulfinylphenothiazine.

Example 22

10 - [3 - (4-acetylamino-1-piperidyl)propyl]-2-methoxyphenothiazine (I; X is 2-CH$_3$O, Y is (CH$_2$)$_3$, Z is S, R is 4-CH$_3$CONH).—By following the manipulative procedure described above in Example 6 and by replacing the 10-(3-chloropropyl)-2-chlorophenothiazine used therein with a molar equivalent amount of 10-(3-chloropropyl)-2-methoxyphenothiazine, there can be obtained 10-[3-(4-acetylamino-1-piperidyl)propyl]-2-methoxyphenothiazine.

Example 23

10-[3-(4-acetylamino-1-piperidyl)propyl]-2-n-amyloxyphenothiazine (I; X is 2-n-C$_5$H$_{11}$O, Y is (CH$_2$)$_3$, Z is S, R is 4-CH$_3$CONH).—By following the manipulative procedure described above in Example 6 and by replacing the 10-(3-chloropropyl)-2-chlorophenothiazine used therein with a molar equivalent amount of 10-(3-chloropropyl)-2-n-amyloxyphenothiazine, there can be obtained 10-[3-(4-acetylamino - 1-piperidyl)propyl]-2-n-amyloxyphenothiazine.

Example 24

10 - [3 -(4-acetylamino-1-piperidyl)propyl]-2-isopropylphenothiazine (I; X is 2-(CH$_3$)$_2$CH, Y is (CH$_2$)$_3$, Z is S, R is 4-CH$_3$CONH).—By following the manipulative procedure described above in Example 6 and by replacing the 10-(3-chloropropyl)-2-chlorophenothiazine used therein with a molar equivalent amount of 10-(3-chloropropyl)-2-isopropylphenothiazine, there can be obtained a 10-[3-(4-acetylamino - 1 - piperidyl)propyl] -2-isopropylphenothiazine.

Example 25

10-[3-(4-acetylamino-1-piperidyl)propyl]-2-n-butylphenothiazine (I; X is 2-n-C$_4$H$_9$, Y is (CH$_2$)$_3$, Z is S, R is 4-CH$_3$CONH).—By following the manipulative procedure described above in Example 6 and by replacing the 10-(3-chloropropyl)-2-chlorophenothiazine used therein with a molar equivalent amount of 10-(3-chloropropyl)-2-n-butylphenothiazine, there can be obtained 10-[3-(4-acetylamino-1-piperidyl)propyl]-2-n-butylphenothiazine.

Example 26

10 - [3-(4-acetylamino-1-piperidyl)propyl]-2-cyanophenothiazine (I; X is 2-CN, Y is (CH$_2$)$_3$, Z is S, R is 4-CH$_3$CONH).—By following the manipulative procedure described above in Example 6 and by replacing the 10-(3-chloropropyl)-2-chlorophenothiazine used therein with a molar equivalent amount of 10-(3-chloropropyl)-2-cyanophenothiazine, there can be obtained 10-[3-(4-acetylamino-1-piperidyl)propyl]-2-cyanophenothiazine.

Example 27

10-[2-(4-acetylamino-1-piperidyl)ethyl]-2-chlorophenothiazine (I; X is 2-Cl, Y is CH$_2$CH$_2$, Z is S, R is 4-CH$_3$CONH).—By following the manipulative procedure described above in Example 6 and by replacing the 10-(3-chloropropyl)-2-chlorophenothiazine used therein with a molar equivalent amount of 10-(2-chloroethyl)-2-chlorophenothiazine, there can be obtained 10-[2-(4-acetylamino-1-piperidyl)ethyl]-2-chlorophenothiazine.

Example 28

10-{2-[3-(4-acetylamino-1-piperidyl)propyl]}-2-chlorophenothiazine (I; X is 2-Cl, Y is CH(CH$_3$)CH$_2$, Z is S, R is 4-CH$_3$CONH).—By following the manipulative procedure described above in Example 6 and by replacing the 10-(3-chloropropyl)-2-chlorophenothiazine used therein with a molar equivalent amount of 10-[2-(3-chloropropyl)]-2-chlorophenothiazine, there can be obtained 10-{2-[3 - (4 - acetylamino-1-piperidyl)propyl]}-2-chlorophenothiazine.

Example 29

10-[4-(4-acetylamino-1-piperidyl)butyl]-2-chlorophenothiazine (I; Z is 2-Cl, Y is (CH$_2$)$_4$, Z is S, R is 4-CH$_3$CONH).—By following the manipulative procedure described above in Example 6 and by replacing the 10-(3-chloropropyl)-2-chlorophenothiazine used therein with a molar equivalent amount of 10-(4-chlorobutyl)-2-chlorophenothiazine, there can be obtained 10-[4-(4-acetylamino-1-piperidyl)butyl]-2-chlorophenothiazine.

Example 30

10-[5-(4-acetylamino-1-piperidyl)pentyl] - 2 - chlorophenothiazine (I; X is 2-Cl, Y is (CH$_2$)$_5$, Z is S, R is 4-CH$_3$CONH).—By following the manipulative procedure described above in Example 6 and by replacing the 10-(3-chloropropyl)-2-chlorophenothiazine used therein with a molar equivalent amount of 10 - (5 - chloropentyl)-2-chlorophenothiazine, there can be obtained 10-[5-(4-acetylamino-1-piperidyl)pentyl]-2-chlorophenothiazine.

Example 31

10-[3-(3-formylamino - 1 - piperidyl)propyl]-2-chlorophenothiazine (I; X is 2-Cl, Y is (CH$_2$)$_3$, Z is S, R is 3-HCONH).—By reacting the free base of 10-[3-(3-amino-1-piperidyl)propyl] - 2 - chlorophenothiazine dihydrochloride obtained above in Example 5 with a mixture of acetic anhydride, and a molar excess of formic acid, there can be obtained 10-[3-(3-formylamino-1-piperidyl)propyl]-2-chlorophenothiazine.

Example 32

10[3-(3-propionylamino - 1 - piperidyl)propyl] - 2-chlorophenothiazine (I; X is 2-Cl, Y is (CH$_2$)$_3$, Z is S, R is 3-CH$_3$CH$_2$CONH).—By reacting the free base of 10-[3-(3-amino-1-piperidyl)propyl] - 2 - chlorophenothiazine dihydrochoride obtained above in Example 5 with a molar excess of propionic anhydride, there can be obtained 10-[3-(3-propionylamino - 1 - piperidyl)propyl] - 2 - chlorophenothiazine.

Example 33

10[3-(3-isobutyrylamino - 1 - piperidyl)propyl] - 2-chlorophenothiazine (I; X is 2-Cl, Y is (CH$_2$)$_3$, Z is S, R is 3-CH$_3$CH(CH$_3$)CONH).—By reacting the free base of the 10-[3-(3-amino - 1 - piperidyl)propyl] - 2 - chlorophenothiazine dihydrochloride obtained above in Example 5 with a molar excess of isobutyric anhydride, there can be obtained 10-[3-(3 - isobutyrylamino - 1 - piperidyl)propyl]-2-chlorophenothiazine.

Example 34

10-[3-(4-benzoylamino - 1 - piperidyl)propyl]-2-chlorophenothiazine (I; X is 2-Cl, Y is (CH$_2$)$_3$, Z is S, R is 4-C$_6$H$_5$CONH).—By heaing the 10-[3-(4-acetylamino-1-piperidyl)propyl]-2-chlorophenothiazine obtained above in Example 6 with aqueous hydrochloric acid according to the manipulative procedure described above in Example 5 and isolating the product from an alkaline medium, there can be obtained 10-[3-(4-amino-1-piperidyl)

propyl]-2-chlorophenothiazine. By reacting the latter with a molar equivalent amount of benzoyl chloride in the presence of a molar equivalent amount of pyridine using an appropriate organic solvent, for example ethylene dichloride, there can be obtained 10-[3-(3-benzoylamino-1-piperidyl)propyl]-2-chlorophenothiazine.

*Example 35*

*10-{3-[4-(4-chlorobenzoylamino)-1-piperidyl]propyl}-2-chlorophenothiazine* (I; X is 2-Cl, Y is (CH$_2$)$_3$, Z is S, R is 4-[4-ClC$_6$H$_4$CONH]).—By following the manipulative procedure described above in Example 34 and by replacing the benzoyl chloride used therein with a molar equivalent amount of 4-chlorobenzoyl chloride, there can be obtained 10-{3-[4-(4-chlorobenzoylamino)-1-piperidyl]propyl}-2-chlorophenothiazine.

*Example 36*

*10-{3-[4-(4-bromobenzoylamino)-1-piperidyl]propyl}-2-chlorophenothiazine* (I; X is 2-Cl, Y is (CH$_2$)$_3$, Z is S, R is 4-[4-BrC$_6$H$_4$CONH]).—By following the manipulative procedure described above in Example 34 and by replacing the benzoyl chloride used therein with a molar equivalent amount of 4-bromobenzoyl chloride, there can be obtained 10-{3-[4-(4-bromobenzoylamino)-1-piperidyl]propyl}-2-chlorophenothiazine.

*Example 37*

*10-{3-[4-(4-methylbenzoylamino)-1-piperidyl]propyl}-2-chlorophenothiazine* (I; X is 2-Cl, Y is (CH$_2$)$_3$, Z is S, R is 4-[4-CH$_3$C$_6$H$_4$CONH]).—By following the manipulative procedure described above in Example 34 and by replacing the benzoyl chloride used therein with a molar equivalent amount of 4-methylbenzoyl chloride, there can be obtanied 10-{3-[4-(4-methylbenzoylamino)-1-piperidyl]propyl}-2-chlorophenothiazine.

*Example 38*

*10-{3-[4-(4-methoxybenzoylamino)-1-piperidyl]propyl}-2-chlorophenothiazine* (I; X is 2-Cl, Y is (CH$_2$)$_3$, Z is S, R is 4-[4-CH$_3$OC$_6$H$_4$CONH]).—By following the manipulative procedure described above in Example 34 and by replacing the benzoyl chloride used therein with a molar equivalent amount of 4-methoxybenzoyl chloride, there can be obtained 10-{3-[4-(4-methoxybenzoylamino)-1-piperidyl]propyl}-2-chlorophenothiazine.

*Example 39*

*10-{3-[4-(4-methylmercaptobenzoylamino)-1-piperidyl]propyl}-2-chlorophenothiazine* (I; X is 2-Cl, Y is (CH$_2$)$_3$, Z is S, R is 4-[4-CH$_3$SC$_6$H$_4$CONH]).—By following the manipulative procedure described above in Example 34 and by replacing the benzoyl chloride used therein with a molar equivalent amount of 4-methylmercaptobenzoyl chloride, there can be obtained 10-{3-[4-(4-methylmercaptobenzoylamino)-1-piperidyl]propyl}-2-chlorophenothiazine.

*Example 40*

*10-{3-[4-(4-acetylbenzoylamino)-1-piperidyl]propyl}-2-chlorophenothiazine* (I; X is 2-Cl, Y is (CH$_2$)$_3$, Z is S, R is 4-[4-CH$_3$COC$_6$H$_4$CONH]).—By following the manipulative procedure described above in Example 34 and by replacing the benzoyl chloride used therein with a molar equivalent amount of 4-acetylbenzoyl chloride, there can be obtained 10-{3-[4-(4-acetylbenzoylamino)-1-piperidyl]propyl}-2-chlorophenothiazine.

*Example 41*

*10-{3-[4-(4-methylsulfonylbenzoylamino)-1-piperidyl]propyl}-2-chlorophenothiazine* (I; X is 2-Cl, Y is (CH$_2$)$_3$, Z is S, R is 4-[4-CH$_3$SO$_2$C$_6$H$_4$CONH]).—By following the manipulative procedure described above in Example 34 and by replacing the benzoyl chloride used therein with a molar equivalent amount of 4-methylsulfonylbenzoyl chloride, there can be obtained 10-{3-[4-(4-methylsulfonylbenzoylamino)-1-piperidyl]propyl}-2-chlorophenothiazine.

*Example 42*

*10-{3-[4-(4-methylsulfinylbenzoylamino)-1-piperidyl]propyl}-2-chlorophenothiazine* (I; X is 2-Cl, Y is (CH$_2$)$_3$, Z is S, R is 4-[4-CH$_3$SOC$_6$H$_4$CONH]).—By following the manipulative procedure described above in Example 34 and replacing the benzoyl chloride used therein with a molar equivalent amount of 4-methylsulfinylbenzoyl chloride, there can be obtained 10-{3-[4-(4-methylsulfinylbenzoylamino)-1-piperidyl]propyl}-2-chlorophenothiazine.

*Example 43*

*10-{3-[4-(3-chloro-4-methylbenzoylamino)-1-piperidyl]propyl}-2-chlorophenothiazine* (I; X is 2-Cl, Y is (CH$_2$)$_3$, Z is S, R is 4-[4-CH$_3$-3-ClC$_6$H$_3$CONH]).—By following the manipulative procedure described above in Example 34 and by replacing the benzoyl chloride used therein with a molar equivalent amount of 3-chloro-4-methylbenzoyl chloride, there can be obtained 10-{3-[4-(3-chloro-4-methylbenzoylamino)-1-piperidyl]propyl}-2-chlorophenothiazine.

We claim:

1. A 10-[1-(piperidyl)lower-alkyl]phenothiazine wherein the lower-alkyl group contains from two to five carbon atoms and has its points of attachment to the phenothiazine and piperidine moieties on different carbon atoms and the piperidyl ring is substituted by a member of the group consisting of amino, lower-alkanoylamino and monocarbocyclic aroylamino radicals in other than the 2-position.

2. A compound having the formula

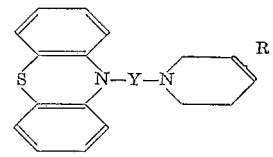

wherein Y represents a lower-alkylene radical containing from two to five carbon atoms and having its points of attachment to the phenothiazine ad piperidine moieties on different carbon atoms and R represents a lower-alkylamino radical in other than the 2-position.

3. A compound having the formula

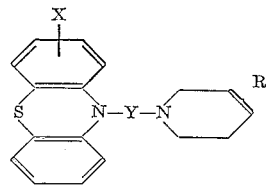

wherein X represents halogen, Y represents a lower-alkylene radical containing from two to five carbon atoms and having its points of attachment to the phenothiazine and piperidine moieties on different carbon atoms and R represents a lower-alkanoylamino radical in other than the 2-position.

4. A compound having the formula

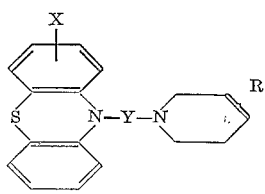

wherein X represents a trifluoromethyl radical, Y represents a lower-alkylene radical containing from two to five carbon atoms and having its points of attachment to the phenothiazine and piperidine moieties on different carbon atoms and R represents a lower-alkanoylamino radical in other than the 2-position.

5. A compound having the formula wherein X represents a trifluoromethyl radical, Y represents a lower-alkylene radical containing from two to five carbon atoms and having its points of attachment to the phenothiazine and piperidine moieties on different carbon atoms and R represents a lower-alkanoylamino radical in other than the 2-position.

6. A compound having the formula wherein X represents a lower-alkylmercapto radical, Y represents a lower-alkylene radical containing from two to five carbon atoms and having its points of attachment to the phenothiazine and piperidine moieties on different carbon atoms and R represents a lower-alkanoylamino radical in other than the 2-position.

7. A compound having the formula wherein X represents a lower-alkylsulfonyl radical, Y represents a lower-alkylene radical containing from two to five carbon atoms and having its points of attachment to the phenothiazine and piperidine moieties on different carbon atoms and R represents a lower-alkanoylamino radical in other than the 2-position.

8. A compound having the formula wherein X represents a lower-alkylsulfinyl radical, Y represents a lower-alkylene radical containing from two to five carbon atoms and having its points of attachment to the phenothiazine and piperidine moieties on different carbon atoms and R represents a lower-alkanoylamino radical in other than the 2-position.

9. A compound having the formula wherein X represents a lower-alkoxy radical, Y represents a lower-alkylene radical containing from two to five carbon atoms and having its points of attachment to the phenothiazine and piperidine moieties on different carbon atoms and R represents a lower-alkanoylamino radical in other than the 2-position.

10. A compound having the formula wherein X represents a cyano radical, Y represents a lower-alkylene radical containing from two to five carbon atoms and having its points of attachment to the phenothiazine and piperidine moieties on different carbon atoms and R represents a lower-alkanoylamino radical in other than the 2-position.

11. 10 - [3-(3-acetylamino-1-piperidyl)propyl]phenothiazine.

12. 10 - [3-(3-acetylamino-1-piperidyl)propyl]-2-chlorophenothiazine.

13. 10 - [3-(4-acetylamino-1-piperidyl)propyl]-2-chlorophenothiazine.

14. 10 - [3 - (3 - amino-1-piperidyl)propyl]-2-chlorophenothiazine.

15. A chemical compound of the formula

16. A compound of the formula

17. A compound selected from the group consisting of a compound of the formula wherein A represents an alkylene chain of from 2 to 4 carbon atoms with at least two carbon atoms between the nitrogen atoms of the piperidine and phenothiazine nuclei, and X is selected from the group consisting of halogen, lower-alkoxy, cyano and trifluoromethyl, and its nontoxic acid addition salts.

References Cited by the Examiner

UNITED STATES PATENTS

| | | | |
|---|---|---|---|
| 2,590,125 | 4/1952 | Robinson | 260—243 |
| 2,645,640 | 7/1953 | Charpentier | 260—243 |
| 2,837,518 | 6/1958 | Jacob et al. | 260—243 |
| 2,902,485 | 9/1959 | Horclois | 260—243 |
| 2,921,069 | 1/1960 | Ullyot | 260—243 |
| 2,928,767 | 3/1960 | Gulesich et al. | 260—243 |

FOREIGN PATENTS

| | | |
|---|---|---|
| 560,570 | 12/1957 | Belgium. |
| 562,299 | 2/1958 | Belgium. |
| 572,181 | 2/1959 | Belgium. |
| 91,198 | 1/1958 | Norway. |

OTHER REFERENCES

Chemical Abstracts, vol. 52, column 6340 (Apr. 25, 1958).

Chiavarelli et al.: Rend. is. super. sanita, vol. 18, pp. 1014 to 1022 (1955).

Nazarov et al.: Zhur. Obsch. Khim., vol. 26, pp. 1496 to 1507 (1951).

Sherlock et al.: Abstracts of Papers, 131st Meeting of Am. Chem. Soc. (1957), pp. 18N–19N.

Tomita I: J. Pharm. Soc. Japan, vol. 71, pp. 220 to 225 (1951).

Tomita II: J. Pharm. Soc. Japan, vol. 71, pp. 1496 to 1507 (1951).

Wagner-Zook: Synthetic Organic Chem., pp. 566–568, pp. 678–679, John Wiley and Sons, New York (1953).

WALTER A. MONDANCE, *Primary Examiner.*

H. J. LIDOFF, DUVAL T. McCUTCHEN, *Examiners.*